United States Patent
Kim et al.

(10) Patent No.: US 7,794,870 B2
(45) Date of Patent: Sep. 14, 2010

(54) BATTERY SUITABLE FOR PREPARATION OF BATTERY MODULE

(75) Inventors: KiJae Kim, Daejeon (KR); Jiheon Lee, Daejeon (KR)

(73) Assignee: LG Chem, Ltd. (KR)

( * ) Notice: Subject to any disclaimer, the term of this patent is extended or adjusted under 35 U.S.C. 154(b) by 911 days.

(21) Appl. No.: 11/515,077

(22) Filed: Sep. 1, 2006

(65) Prior Publication Data

US 2007/0059593 A1    Mar. 15, 2007

(30) Foreign Application Priority Data

Sep. 2, 2005    (KR)    ............. 10-2005-0081478

(51) Int. Cl.
*H01M 2/06*    (2006.01)
*H01M 2/20*    (2006.01)
*H01M 2/22*    (2006.01)
*H01M 10/02*    (2006.01)

(52) U.S. Cl. ............... 429/158; 429/148; 429/152; 429/162

(58) Field of Classification Search ............ 429/158
See application file for complete search history.

(56) References Cited

U.S. PATENT DOCUMENTS

| | | | |
|---|---|---|---|
| 5,871,861 A * | 2/1999 | Hirokou et al. | ............. 429/149 |
| 2002/0142214 A1 * | 10/2002 | Pekala et al. | ............. 429/144 |
| 2003/0224246 A1 * | 12/2003 | Watanabe et al. | ........... 429/159 |
| 2004/0091771 A1 * | 5/2004 | Hosaka et al. | ............. 429/185 |

* cited by examiner

*Primary Examiner*—Dah-Wei D Yuan
*Assistant Examiner*—Jacob Marks
(74) *Attorney, Agent, or Firm*—Cantor Colburn LLP (57) ABSTRACT

Disclosed herein are a battery having an electrode assembly, which can be charged and discharged, mounted in a plate-shaped battery case, and cathode and anode terminals protruding from opposite ends of the battery case, wherein the electrode terminals are deviated from each other about the vertical central axis on the plane of the battery cell while the electrode terminals are arranged in a symmetrical fashion, the battery case includes an upper case and a lower case, only one of which is provided with a location part for receiving the electrode assembly, and the electrode terminals are deviated toward the upper or lower case which has no location part on the vertical section of the battery cell, and a battery module including the same.

9 Claims, 7 Drawing Sheets

BATTERY SUITABLE FOR PREPARATION OF BATTERY MODULE

FIELD OF THE INVENTION

The present invention relates to a battery having electrode terminals formed at opposite ends thereof such that the electrode terminals are deviated from each other, and a battery module including the same. More particularly, the present invention relates to a battery having an electrode assembly, which can be charged and discharged, mounted in a plate-shaped battery case, and cathode and anode terminals protruding from opposite ends of the battery case, wherein the electrode terminals are deviated from each other about the vertical central axis on the plane of the battery cell while the electrode terminals are arranged in a symmetrical fashion, the battery case includes an upper case and a lower case, only one of which is provided with a location part for receiving the electrode assembly, and the electrode terminals are deviated toward the upper or lower case which has no location part on the vertical section of the battery cell, and a battery module constructed in a structure in which unit cells are adjacent to each other such that the surfaces of electrode terminals deviated in the thickness face each other, and the unit cells are also adjacent to each other in the lateral direction.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several battery cells for each device. On the other hand, medium- or large-sized devices, such as vehicles, use a medium- or large-sized battery pack having a plurality of battery cells electrically connected with each other because high output and large capacity are necessary for the medium- or large-sized devices.

Preferably, the medium- or large-sized battery pack is manufactured with small size and small weight if possible. For this reason, a plate-shaped battery cell, such as a prismatic battery or a pouch-shaped battery, which can be stacked with high integration and has a small weight to capacity ratio, is usually used as a unit cell of the medium- or large-sized battery pack. Especially, much interest is currently generated in the pouch-shaped battery, which uses an aluminum laminate sheet as a sheathing member (a battery case).

In the plate-shaped battery, the electrode terminals generally may protrude from the outer surface of the battery on the same plane. Alternatively, one of the electrode terminals may protrude from the outer surface of the battery, and the battery case of the battery may serve as the other electrode terminal. In the former case, however, the cathode terminal and the anode terminal are positioned on the same plane, and therefore, the possibility of short circuits is high during the handling of the battery or during the manufacturing of a battery pack. In the latter case, on the other hand, the possibility of short circuits is higher. In addition, most of the battery case must be insulated excluding the region used as the electrode terminal, whereby the process is troublesome and complicated.

Figure 1:
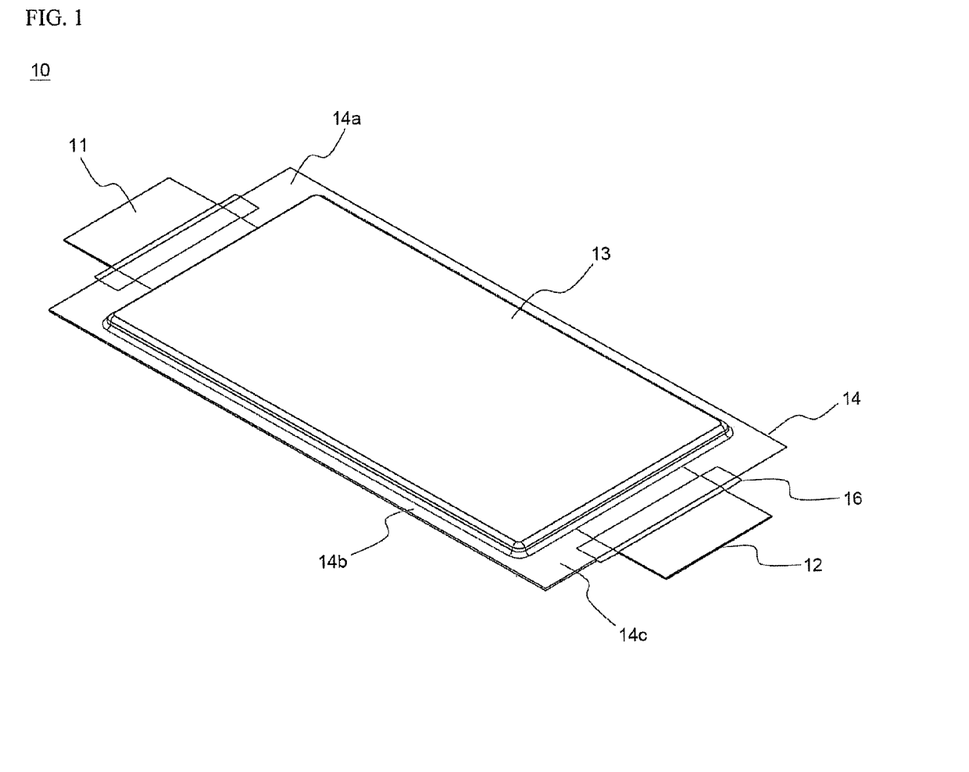
FIGS. 1 and 2 are a perspective view and a vertical sectional view illustrating a conventional representative pouch-shaped battery.
Figure 2:
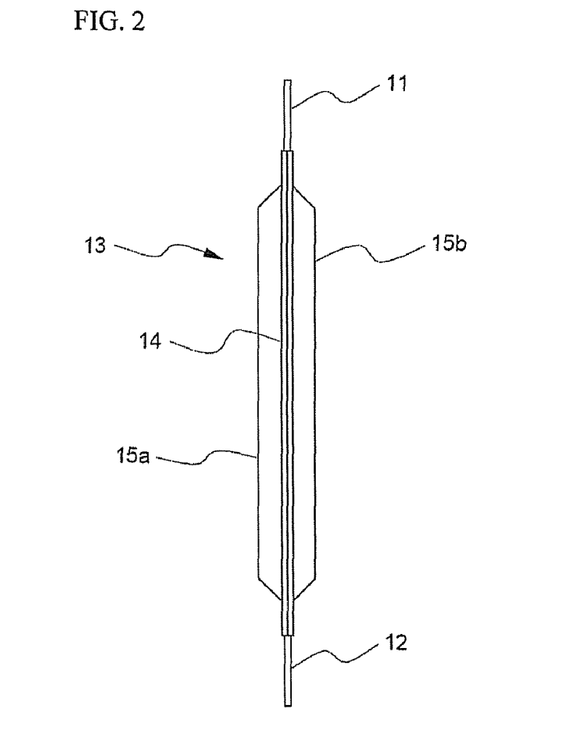

For this reason, there have been developed structures in which the electrode terminals protrude from different regions of the outer surface of the battery. One of them is a battery structure in which the electrode terminals are formed at the opposite ends of the battery. An example is illustrated in FIGS. 1 and 2, which are a perspective view and a vertical sectional view illustrating a conventional representative pouch-shaped battery.

Referring to these drawings, a pouch-shaped battery 10 is constructed in a structure in which two electrode leads (electrode terminals) 11 and 12 protrude from the upper and lower ends of a battery cell 13, respectively, while the electrode leads are opposite to each other. The electrode leads 11 and 12 are formed at the opposite ends of the battery cell such that the electrode leads 11 and 12 are positioned on the same axis and the electrode leads 11 and 12 are positioned in the middle of the battery cell 13. Consequently, the pouch-shaped battery 10 is constructed in a symmetrical structure.

A sheathing member 14 is a two-unit member including upper and lower sheathing parts. While an electrode assembly (not shown) is received in a location part 15 defined in the sheathing member 14, the contact regions of the sheathing member 14, i.e., the opposite sides 14a, the upper ends 14b, and the lower ends 14c of the sheathing member 14 are bonded to each other. In this way, pouch-shaped battery 10 is manufactured. The sheathing member 14 is constructed in a laminate structure including a resin layer/a metal film layer/a resin layer. Consequently, it is possible to bond the opposite sides 14a and the upper and lower ends 14b and 14c of the upper and lower sheathing parts of the sheathing member 14, which are in contact with each other, to each other by applying heat and pressure to the opposite sides 14a and the upper and lower ends 14b and 14c of the upper and lower sheathing parts of the sheathing member 14 so as to weld the resin layers to each other. According to circumstances, the opposite sides 14a and the upper and lower ends 14b and 14c of the upper and lower sheathing parts of the sheathing member 14 may be bonded to each other using a bonding agent. For the opposite sides 14a of the sheathing member 14, the same resin layers of the upper and lower sheathing parts of the sheathing member 14 are in direct contact with each other, whereby uniform sealing at the opposite sides 14a of the sheathing member 14 is accomplished by welding. For the upper and lower ends 14b and 14c of the sheathing member 14, on the other hand, the electrode leads 11 and 12 protrude from the upper and lower ends 14b and 14c of the sheathing member 14. For this reason, the upper and lower ends 14b and 14c of the upper and lower sheathing parts of the sheathing member 14 are thermally welded to each other, while a film-shaped sealing member 16 is interposed between the electrode leads 11 and 12 and the sheathing member 14, in consideration of the thickness of the electrode leads 11 and 12 and the difference in material between the electrode leads 11 and 12 and the sheathing member 14, so as to increase sealability.

When viewing the vertical section of the pouch-shaped battery 10, the battery cell 13 is positioned on the central axis of the battery. That is to say, an upper location part 15a and a lower location part 15b protrude from the central axis of the battery to the same thickness.

Figure 3:
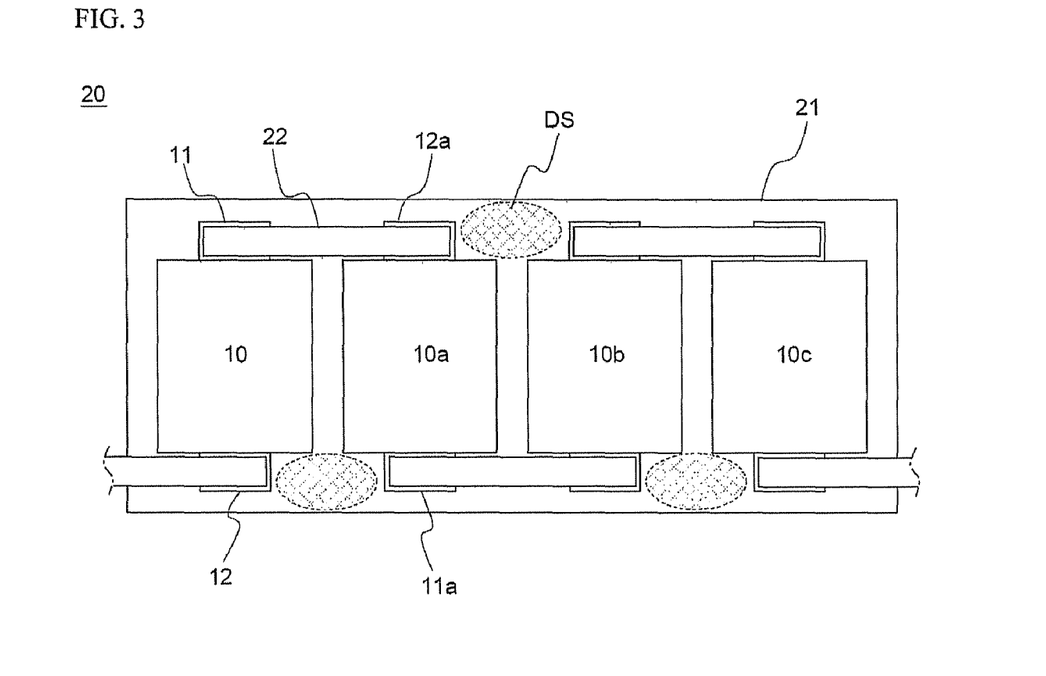
FIG. 3 is a typical view illustrating a battery module constructed by electrically connecting a plurality of pouch-shaped batteries, one of which is shown in FIG. 1.

FIG. 3 is a typical view illustrating a battery module constructed by electrically connecting a plurality of pouch-shaped batteries, one of which 10 is shown in FIG. 1.

Referring to FIG. 3, a plurality of batteries 10, 10a, 10b, and 10c are arranged on the same plane in a module case, and the batteries 10, 10a, 10b, and 10c are electrically connected with each other via corresponding bus bars 22. In this way, a battery module 20 is constructed. The length of bus bars 22 is decided depending upon the distance between the corresponding electrode terminals 11 and 12a of the two neighboring batteries 10 and 10a. When the length of the bus bars 22 is increased, the inner resistance of the battery module is also increased, and therefore, the performance of the battery module is lowered. Consequently, in order to reduce the resistance due to the connection between the batteries 10 and 10a, i.e., in order to reduce the length of the bus bars 22, there have been proposed some conventional arts for increasing the width of the electrode terminals 11, 12, 11a and 12a. However, the increase of the electrode terminal width to the battery width ratio increases the possibility of short circuits during the assembly of the battery module.

Furthermore, no bus bar 22 is provided between the electrode terminals 12a and 11b of the battery module shown in FIG. 3, i.e., a dead space (DS) exists between electrode terminals 12a and 11b. In consideration of the size of the batteries 10a and 10b, and the size and the position of the electrode terminals 12 and 11b, however, the dead space is limited to be utilized for a special purpose. In consideration of the fact that the necessity of a battery pack constructed in a compact structure while providing the same capacity and output becomes high, research into a battery module structure utilizing the dead space is also required.

In order to efficiently construct the battery module using the pouch-shaped battery 10 having the structure shown in FIG. 1 as a unit cell, it is necessary that the unit cells 10a, 10b, 10c, and 10d are arranged in the lateral direction (in the horizontal direction) as shown in FIG. 3. This is because, when the unit cells 10a, 10b, 10c, and 10d are arranged in the thickness direction (in the vertical direction), the connection of connecting members, such as the bus bars, for electrically connecting the unit cells 10a, 10b, 10c, and 10d is difficult. When the vertically disposed electrode terminals are to be electrically connected with each other, not the plate-shaped bus bars but three-dimensional connecting members are necessary. In this case, a welding process for connection is troublesome and complicated.

In addition, the pouch-shaped battery 10 as shown in FIG. 1 has a small thickness, and therefore, the pouch-shaped batteries are arranged only in the horizontal direction, whereby the mechanical strength of the battery module is very small. For this reason, it is necessary to use a strong member, such as a cartridge, in order to increase the mechanical strength.

SUMMARY OF THE INVENTION

Therefore, the present invention has been made to solve the above problems, and other technical problems that have yet to be resolved.

Specifically, it is a first object of the present invention to provide a battery that is capable of reducing the length of a connecting member for electrically connecting electrode terminals, and therefore, reducing the inner resistance of a battery module, at the time of manufacturing the battery module.

It is a second object of the present invention to provide a battery that is capable of forming a dead space which is so large that it can be used for another purpose at the time of manufacturing a battery module.

It is a third object of the present invention to provide a battery that is capable of easily accomplishing the electrical connection when the battery is stacked on another battery in the vertical direction so as to manufacture a battery module having high strength.

It is a fourth object of the present invention to provide a battery module using the above-described batteries as unit cells, whereby the battery module is manufactured in a compact structure, the assembly of the battery module is easy, and the battery module has high strength.

In accordance with one aspect of the present invention, the above and other objects can be accomplished by the provision of a battery having an electrode assembly, which can be charged and discharged, mounted in a plate-shaped battery case, and cathode and anode terminals protruding from opposite ends of the battery case, wherein the electrode terminals are deviated from each other about the vertical central axis on the plane of the battery cell while the electrode terminals are arranged in a symmetrical fashion, the battery case includes an upper case and a lower case, only one of which is provided with a location part for receiving the electrode assembly, and the electrode terminals are deviated toward the upper or lower case which has no location part on the vertical section of the battery cell.

In the battery according to the present invention, the cathode terminal and the anode terminal protrude from the ends on the major axis or the minor axis of the battery such that the cathode terminal and the anode terminal are opposite to each other. The cathode terminal and the anode terminal are deviated from each other on the plane and the vertical section of the battery cell. Consequently, when a plurality of batteries are arranged in the lateral direction (in the horizontal direction) so as to construct a battery module, the length of connecting members for electrical connection between the electrode terminals is greatly reduced, and therefore, the inner resistance of the battery module is decreased. Also, it is possible to secure the size of a dead space (DS) defined in the battery module such that the dead space can be used for another purpose. When the batteries are arranged in the thickness direction (in the vertical direction) so as to construct a battery module, on the other hand, the battery case surfaces which have no location parts face each other, and therefore, it is possible to easily accomplish the electrical connection between the electrode terminals.

The battery according to the present invention is a thin-type battery generally having a small thickness. Consequently, a prismatic battery or a pouch-shaped battery may be used as the battery according to the present invention. Preferably, the battery has a battery case constructed in a laminate structure including a metal layer and a resin layer. A typical example of the battery is a pouch-shaped battery having a battery case made of a laminate sheet including aluminum and resin. In the pouch-shaped battery, the battery case may be constructed in various structures. For example, the battery case may be constructed either in a structure in which the electrode assembly is received in a location part formed at the upper inner surface or the lower inner surface of a one-unit folding type member, and the upper and lower contact regions are sealed, or in a structure in which the electrode assembly is received in a location part formed at the upper inner surface or the lower inner surface of a two-unit member, and the upper and lower contact regions are sealed.

The electrode assembly comprises cathodes and anodes, by which the charge and the discharge of the battery are possible. The electrode assembly is constructed in a structure in which the cathodes and the anodes are stacked while separators are disposed between the cathodes and the anodes. For example, the electrode assembly is constructed in a jelly-roll type structure or in a stack type structure. The cathodes and the anodes of the electrode assembly may be constructed such that an electrode tap of the cathodes and an electrode tap of the anodes directly protrude outward from the battery. Alternatively, the cathodes and the anodes of the electrode assembly may be constructed such that the electrode tap of the cathodes and the electrode tap of the anodes are connected to additional electrode leads, and the electrode leads protrude outward from the battery. In a preferred embodiment of the present invention, the electrode terminals are located at opposite ends on the major axis of the battery.

As described above, one of the characteristics of the present invention is that the electrode terminals are deviated from each other about the vertical central axis on the plane of the battery cell while the electrode terminals are arranged in a symmetrical fashion. Another characteristic of the present invention is that the electrode terminals are deviated toward the upper or lower case which has no location part on the vertical section of the battery cell.

In connection with the first characteristic of the present invention, the plane in the "vertical central axis on the plane of the battery cell" means the large upper and lower surfaces of the plate-shaped battery case, and the vertical central axis in the "vertical central axis on the plane of the battery cell" means the central axis of the battery cell in the direction in which the electrode terminals are oriented. Consequently, the electrode terminals according to the present invention are formed at the opposite ends of the battery case at the positions where the electrode terminals are symmetrical to each other at the right and left sides about the central axis. For easy description, this deviated structure will be referred to as a "deviated structure on the central axis."

In connection with the second characteristic of the present invention, the location part for receiving the electrode assembly of the battery is formed at either the upper case or the lower case. Consequently, when the location part for receiving the electrode assembly is formed, for example, only at the upper case, the electrode terminals are deviated toward the lower case. For easy description, this deviated structure will be referred to as a "deviated structure in the thickness direction."

The battery according to the present invention is constructed with the deviated structure on the central axis and the deviated structure in the thickness direction. Consequently, the battery according to the present invention provides various advantages when constructing a battery module, which will be described below in more detail.

In the deviated structure on the central axis, the deviation of the electrode terminals may be changed depending upon various conditions. In a preferred embodiment, the electrode terminals may be deviated such that the electrode terminals are offset completely from the vertical central axis on the plane of the battery cell.

Although the width of the electrode terminals is not particularly restricted, the width of the electrode terminals may be less than, preferably, ½, more preferably, ⅖ of that of the battery cell. For example, when the width of the electrode terminals may be less than ⅖ of that of the battery cell, and the electrode terminals are offset completely from the vertical central axis on the plane of the battery cell, it is possible to secure the size of the dead space (DS) such that the dead space can be used for another purpose at the time of arranging a plurality of batteries so as to construct a battery module. Also, when the unit cells are arranged in the thickness direction so as to construct a battery module, as will be described hereinafter in detail, it is possible to easily accomplish the electrical connection between the unit cells.

In the deviated structure in the thickness direction, the deviation of the electrode terminals may be changed depending upon various factors. In a preferred embodiment, the electrode terminals are completely deviated such that the electrode terminals are brought into contact with the battery case surface which has no location part or formed at a position adjacent to the battery case surface which has no location part.

In accordance with another aspect of the present invention, there is provided a battery module including a plurality of batteries with the above-stated construction as unit cells. In the battery module according to the present invention, the unit cells are arranged such that adjacent electrode terminals are positioned within the shortest distance, and the adjacent electrode terminals are electrically connected with each other via connection members, such as bus bars.

The connection between the electrodes and the connecting members is generally accomplished by welding, soldering, or mechanical coupling, although the connection between the electrodes and the connecting members is not particularly restricted.

In the battery module according to the present invention, the unit cells may be arranged in various structures. For example, two or more unit cells may be arranged in a lateral arrangement structure (a plane arrangement structure) of an N×1 matrix in which the unit cells are arranged only in the lateral direction, and two or more unit cells may be arranged in a three-dimensional arrangement structure of an N×n matrix in which the unit cells are arranged in the lateral direction and in the thickness direction.

The arrangement of the unit cells in the lateral direction in the lateral arrangement structure and in the three-dimensional arrangement structure may be accomplished by arranging the unit cells such that the electrode terminals of two unit cells to be electrically connected with each other are adjacent to each other. Consequently, the length of the connecting members is reduced, and therefore, the structural stability of the battery module is improved while the inner resistance of the battery module is reduced. In addition, it is possible to increase the size of the dead space (DS) such that the dead space can be used for various purposes.

The arrangement of the unit cells in the thickness direction in the three-dimensional arrangement structure may be accomplished by arranging the unit cells such that the battery case surfaces of two unit cells which have no location parts face each other, and, at the same time, the electrode terminals of two unit cells to be electrically connected with each other are spaced apart from each other. According to this arrangement, the electrode terminals of the two unit cells are positioned adjacent to the plane, and therefore, the electrical connection between the electrode terminals is easily accomplished. These electrode terminals are electrically connected with each other, for example, via a bus bar having a step.

As described above, the battery module according to the present invention may be easily constructed in the three-dimensional arrangement structure. In a preferred embodiment, the battery module includes an integrated frame constructed in a layer structure, and the frame is provided with a plurality of receiving parts, into which a unit cell group having two or more unit cells arranged in the lateral direction and two or more unit cells arranged in the thickness direction can be loaded. Preferably, the loading of the unit cell group into the receiving parts may be performed in a sliding fashion.

In this battery module structure, the unit cells of the unit cell group, which are arranged in the three-dimensional arrangement structure and electrically connected with each other, are introduced into the respective receiving parts, and the respective receiving parts have connection terminals for electrical connection with the adjacent receiving parts.

A single battery module may be constructed as a battery pack. According to circumstances, a plurality of battery modules are electrically connected with each other so as to construct a medium- or large-sized battery pack.

Preferably, medium- or large-sized battery pack is used as a power source for various devices requiring high output and large capacity, such as electric vehicles (EV), hybrid electric vehicles (HEV), electric motorcycles, electric bicycles, etc.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 4:
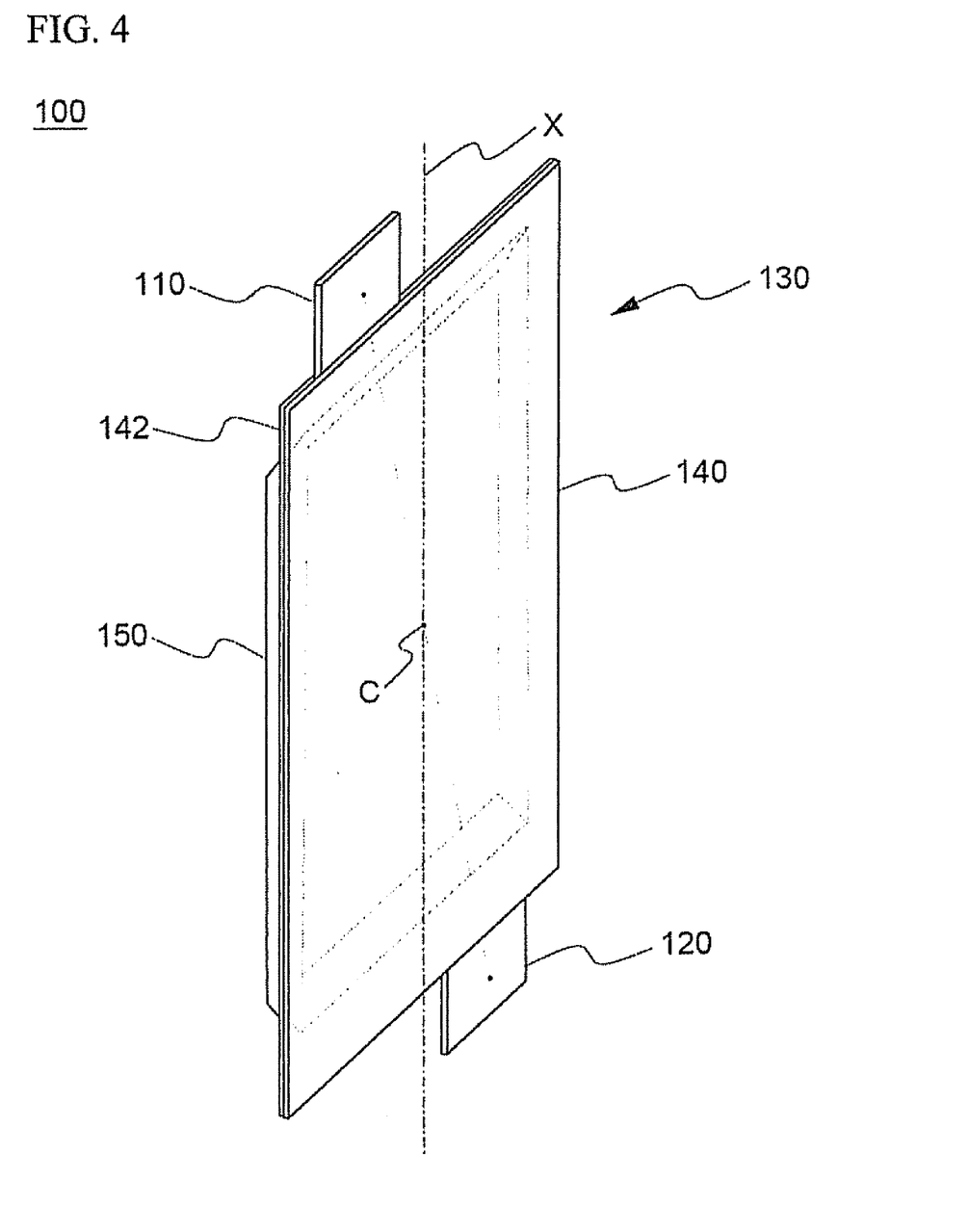
FIGS. 4 to 6 are a perspective view, a plan view, and a vertical sectional view typically illustrating a battery according to a preferred embodiment of the present invention.
Figure 5:
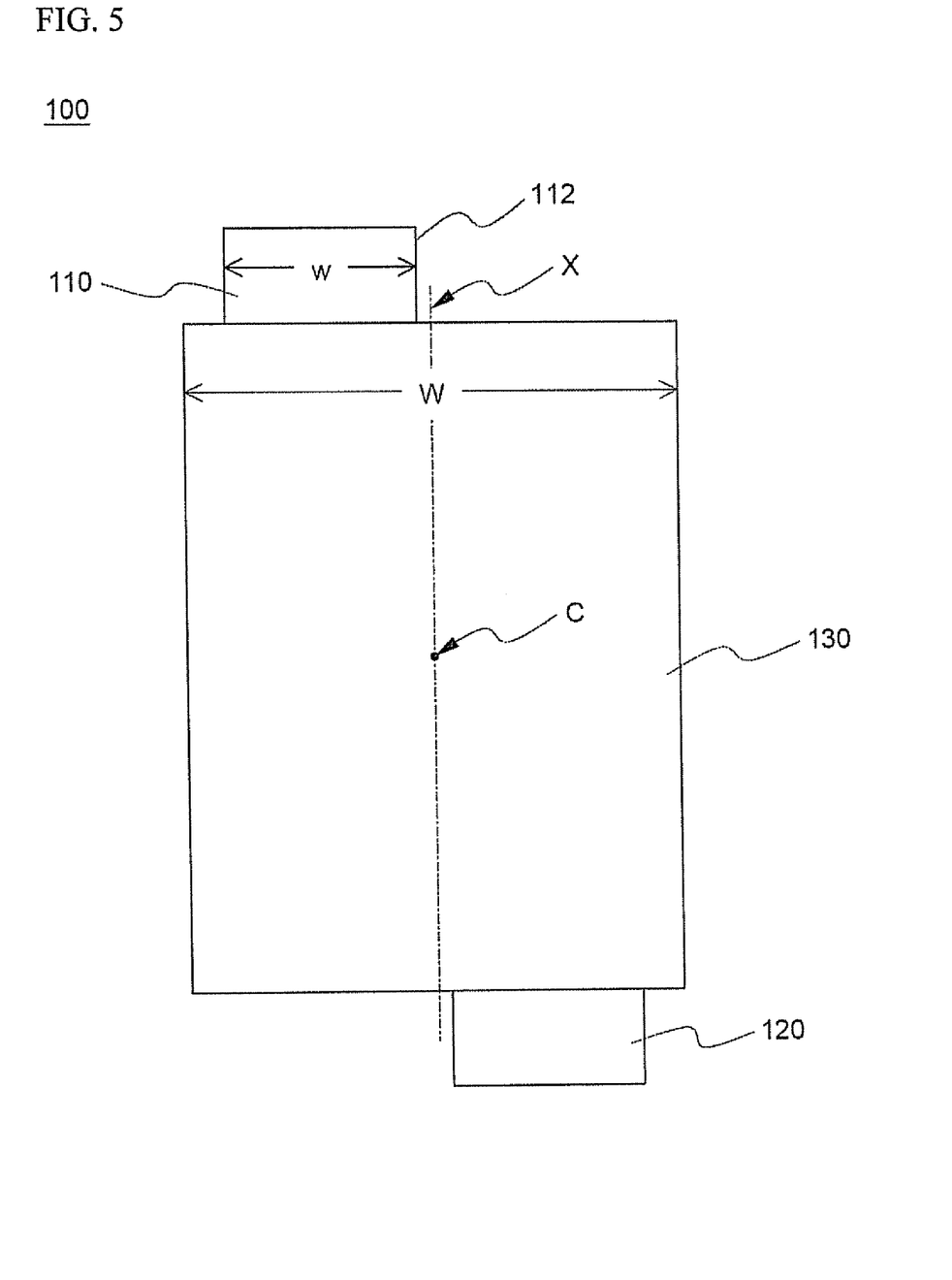
Figure 6:
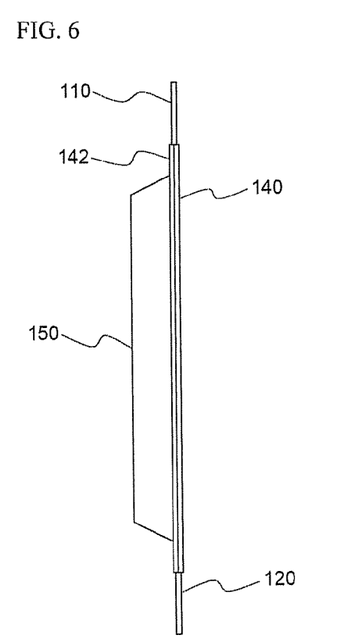

FIGS. 4 to 6 are a perspective view, a plan view, and a vertical sectional view typically illustrating a battery according to a preferred embodiment of the present invention. The battery shown in these drawings is based on the battery of FIG. 1 in terms of the basic construction of the battery. Consequently, only the difference between the battery according to the present invention and the battery of FIG. 1 will be described below.

Referring to these drawings, a battery 100 has two electrode taps 110 and 120, which protrude from the upper and lower ends of a battery cell 130 along the major axis of the battery cell 130. Also, the electrode taps 110 and 120 are deviated from each other about the vertical central axis X on the plane of the battery cell 130. On the other hand, the deviated electrode taps 110 and 120 are arranged in a symmetrical fashion about the center C of the battery cell 130. In addition, the width w of the electrode tap 110 is less than ½ of the width W of the battery cell, and the inner side of the electrode tap 110 is spaced apart from the central axis X.

A location part 150, in which an electrode assembly (not shown) is received, is formed in a lower case 142, which is one of battery cases 140 and 142, whereas no location part 150 is formed in the upper case 140. Consequently, the electrode taps 110 and 120 are deviated toward the lower case 140 in the thickness direction of the battery case 130.

Figure 7:
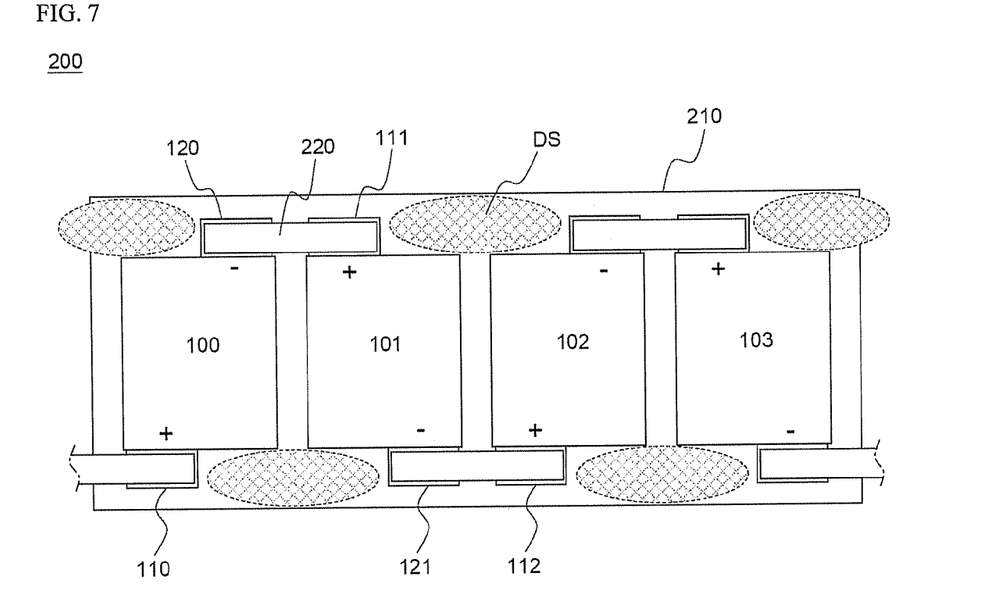
FIG. 7 is a typical view illustrating a battery module according to a preferred embodiment of the present invention having a plurality of batteries constructed in a lateral arrangement structure, one of which is shown in FIG. 4.

FIG. 7 is a typical view illustrating a battery module according to a preferred embodiment of the present invention having a plurality of batteries constructed in a lateral arrangement structure, one of which is shown in FIG. 4.

Referring to FIG. 7, a battery module 200 includes four unit cells 100, 101, 102, and 103 arranged in the lateral direction (in the horizontal direction) in a module case 210 on the same plane. The unit cells 100, 101, 102, and 103 are electrically connected with each other via bus bars 220, which are connecting members, while the unit cells 100, 101, 102, and 103 are arranged such that electrode taps of the unit cells 100, 101, 102, and 103 are adjacent to each other. For example, an anode tap 120 of the first unit cell 100, which is deviated toward the right end corner, is electrically connected with a cathode tap 111 of the second unit cell 101, which is deviated toward the left end corner, via the bus bar 220 within a short distance. On the other hand, an anode tap 121 of the second unit cell 101, which is deviated toward the left end corner, is electrically connected with a cathode tap 112 of the third unit cell 102, which is deviated toward the right end corner, via the bus bar 220 within a short distance. Consequently, in the case that the batteries and the electrode taps have the same size, the bus bar 220 of FIG. 7 accomplishes the electrical connection even when the length thereof is small, and therefore, the inner resistance of the battery module is decreased, as compared to the bus bar 22 of FIG. 2.

Due to the deviated positions of the electrode taps and the unique arrangement of the unit cells, the size of the dead space (DS), in which the electrode taps 110, 120, 111, 121 . . . and the bus bars 220 are not provided, is greater than that of the dead space shown in FIG. 3. When the battery pack is constructed, the dead space DS may be advantageously used as a coolant channel or as an installation space for installing the battery module 200 in the inner space of a battery pack housing (not shown).

Figure 8:
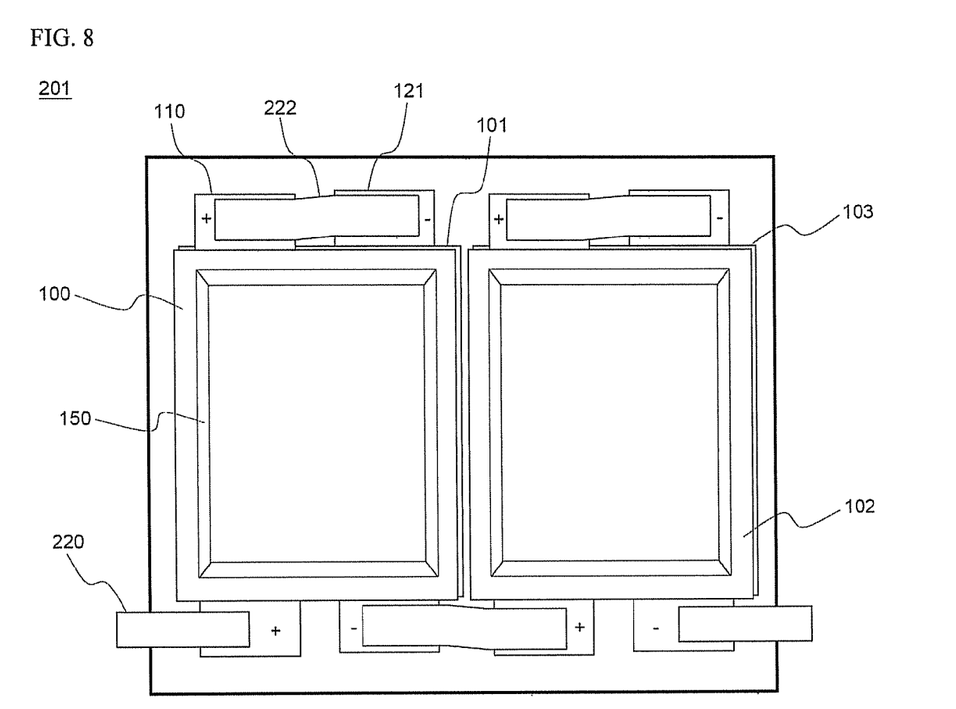
FIG. 8 is a typical view illustrating a battery module according to another preferred embodiment of the present invention having a plurality of batteries constructed in a three-dimensional arrangement structure, one of which is shown in FIG. 4.

FIG. 8 is a typical view illustrating a battery module according to another preferred embodiment of the present invention having a plurality of batteries constructed in a three-dimensional arrangement structure, one of which is shown in FIG. 4.

Referring to FIG. 8, a battery module 201 is constructed in a three-dimensional arrangement structure of a 2×2 matrix in which two of four unit cells 100, 101, 102, and 103 are arranged in the lateral direction and two of the four unit cells 100, 101, 102, and 103 are arranged in the thickness direction.

In the case of the two unit cells 100 and 101 arranged in the thickness direction, battery case surfaces at which location parts 150 are not formed face each other, and, at the same time, electrode taps 110 and 121 to be electrically connected with each other are spaced apart from each other. Consequently, the height deviation between the electrode taps 110 and 121 is very small although the two unit cells 100 and 101 are arranged in the thickness direction, and therefore, it is possible to easily accomplish the electrical connection between the electrode taps 110 and 121 using a bus bar 222 having a step corresponding to such a deviation.

The electrical connection between the unit cells 100 and 102 arranged in the lateral direction as shown in FIG. 8 may be accomplished in the same manner as the electrical connection between the unit cells 100 and 101.

In this way, the plurality of unit cells 100, 101, 102, and 103 are mounted in the battery case while the unit cells are arranged in the three-dimensional arrangement structure, and the unit cells are electrically connected with each other using the bus bars 220 for external input and output, whereby a battery module 210 is constructed.

Figure 9:
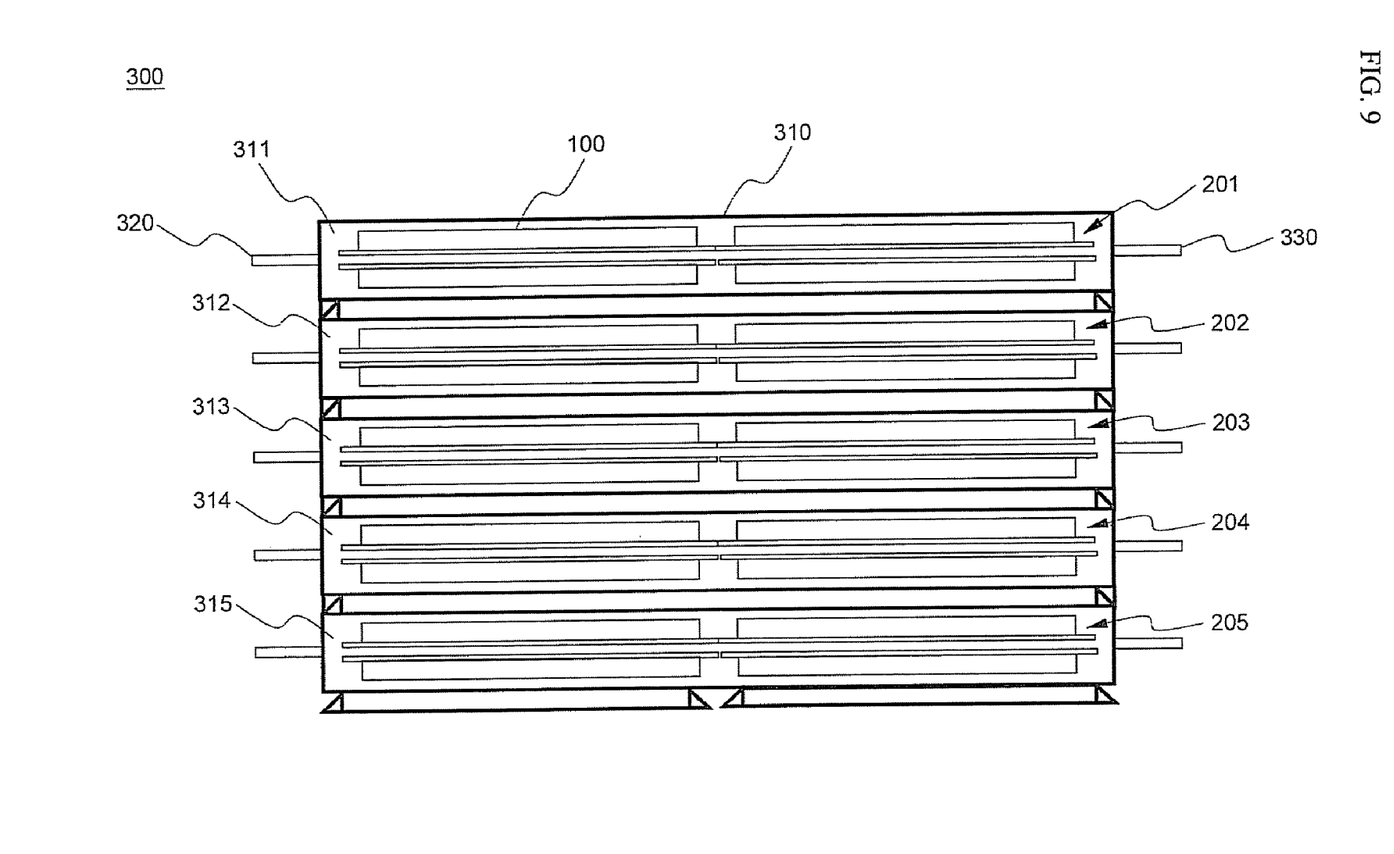
FIG. 9 is a typical view illustrating a medium- or large-sized battery module according to another preferred embodiment of the present invention constructed by arranging a plurality of battery modules having the three-dimensional arrangement structure as shown in FIG. 8.

FIG. 9 is a typical view illustrating a medium- or large-sized battery module according to another preferred embodiment of the present invention. A medium- or large-sized battery module 300 of FIG. 9 is constructed by arranging a plurality of battery modules having the three-dimensional arrangement structure as shown in FIG. 8 as unit modules.

Referring to FIG. 9, the medium- or large-sized battery module 300 is constructed in a structure in which a plurality of unit modules 201, 202, 203 . . . having a three-dimensional arrangement structure of a 2×2 matrix are loaded into a layer-structure frame 310 having a plurality of receiving parts 311, 312, 313, 314, and 315 defined therein in a sliding fashion. The arrangement and the electrical connection of the unit cells 100 for the respective unit modules 201, 202, 203 . . . are the same as that of FIG. 8, although the arrangement and the electrical connection of the unit cells 100 are not limited thereto. The battery module 300, which is capable of receiving the unit cells in the sliding fashion, is constructed in a bookshelf structure, and therefore, the battery module 300 has high structural stability, and the assembly of the battery module 300 is easily accomplished.

While the unit cells 201, 202, 203 . . . are mounted in the respective receiving parts 311, 312, 313 . . . , input and output terminals formed outside the respective receiving parts 311, 312, 313 . . . are electrically connected with each other, whereby the battery module 300 is easily assembled and manufactured.

According to circumstances, the respective receiving parts 311, 312, 313 . . . may be constructed in a structure in which the assembly and disassembly of the respective receiving parts 311, 312, 313 . . . are possible, whereby the medium- or large-sized battery module 300 can be selectively manufactured depending upon desired capacity and output.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the battery according to the present invention is characterized in that the electrode terminals of the battery are deviated based on specific conditions. Consequently, when a plurality of batteries are arranged in various manners so as to construct a battery module, the length of the connecting members for electrical connection between the electrode terminals is minimized, and therefore, the inner resistance of the battery module is decreased. Also, it is possible to secure the size of the dead space such that the dead space can be used for another purpose, and therefore, it is possible to manufacture a battery module having smaller size. Furthermore, the unit cells can be arranged not only in the lateral direction but also in the thickness direction. Consequently, it is possible to easily accomplish the electrical connection between the unit cells, and therefore, it is possible to easily manufacture a battery module having high mechanical stability. The battery module can be preferably used in a medium- or large-sized battery pack, which is a power source for electric vehicles, hybrid electric vehicles, electric motorcycles, and electric bicycles.

What is claimed is:

1. A battery module, including:
   a plurality of unit cells, each unit cell having an electrode assembly, which can be charged and discharged, the plurality of unit cells mounted in a plate-shaped battery case, wherein
   electrode terminals of the plurality of unit cells protrude from opposite ends of the battery case,
   the electrode terminals of each unit cell deviate from each other about a vertical central axis of the unit cell, the vertical axis being on a plane of the unit cell, and the electrode terminals are arranged in a symmetrical fashion,
   the battery case includes an upper case and a lower case, only one of which is provided with a location part for receiving the electrode assembly, and the electrode terminals deviate toward the upper or lower case which has no location part on a vertical section of the unit cell;
   the electrode terminals have a width which is less than one half of a width of the unit cell, and the electrode terminals deviate such that the electrode terminals are offset completely from the central axis of the unit cell;
   the unit cells are arranged in a three-dimensional arrangement structure of an N×n matrix in which the unit cells are arranged in a lateral direction and in a thickness direction, which is perpendicular to a lateral direction;
   the unit cells in the lateral direction of the three-dimensional arrangement structure have electrode terminals, which are to be electrically connected with each other, disposed adjacent to each other, and
   the unit cells in the thickness direction of the three-dimensional arrangement structure are disposed such that surfaces of the unit cells in the thickness direction, which do not have location parts, face each other, and the electrode terminals of the unit cells in the thickness direction, which are to be electrically connected with each other, are spaced apart from each other.

2. The battery module according to claim 1, wherein the unit cell is a pouch-shaped battery having a battery case constructed in a laminate structure including a metal layer and a resin layer.

3. The battery module according to claim 2, wherein the battery case is constructed either in a structure in which the electrode assembly is received in a location part formed at the upper inner surface or the lower inner surface of a one-unit folding type member, and the upper and lower contact regions are sealed, or in a structure in which the electrode assembly is received in a location part formed at the upper inner surface or the lower inner surface of a two-unit member, and the upper and lower contact regions are sealed.

4. The battery module according to claim 1, wherein the electrode terminals are located at opposite ends on the major axis of the unit cell.

5. The battery module according to claim 1, wherein the electrode terminals are completely deviated such that the electrode terminals are brought into contact with the battery case surface which has no location part or formed at a position adjacent to the battery case surface which has no location part.

6. The battery module according to claim 1, wherein the spaced electrode terminals are electrically connected with each other via a bus bar having a step.

7. The battery module according to claim 1, wherein the battery module includes an integrated frame constructed in a layer structure, and the frame is provided with a plurality of receiving parts, into which a unit cell group having two or more unit cells arranged in the lateral direction and two or more unit cells arranged in the thickness direction can be loaded.

8. The battery module according to claim 7, wherein the loading of the unit cell group into the receiving parts is performed in a sliding fashion.

9. The battery module according to claim 7, wherein the receiving parts are constructed in a structure in which the assembly and disassembly of the receiving parts are possible.

* * * * *